(12) United States Patent
Rai et al.

(10) Patent No.: US 9,237,028 B1
(45) Date of Patent: Jan. 12, 2016

(54) METHOD AND APPARATUS FOR GENERATING A TETHERING ALERT BASED ON A THRESHOLD SIMILARITY BETWEEN INCOMING DATA AND OUTGOING DATA

(75) Inventors: Deveshkumar N. Rai, Overland Park, KS (US); Sachin R. Vargantwar, Macon, GA (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 710 days.

(21) Appl. No.: 13/585,543

(22) Filed: Aug. 14, 2012

(51) Int. Cl.
*H04L 15/16* (2006.01)
*H04L 12/26* (2006.01)
*H04L 29/06* (2006.01)

(52) U.S. Cl.
CPC .... *H04L 12/2692* (2013.01); *G06F 2209/5022* (2013.01); *H04L 29/06* (2013.01); *H04L 43/16* (2013.01); *H04L 63/1408* (2013.01)

(58) Field of Classification Search
CPC ..... H04L 29/06; H04L 43/16; H04L 63/1408; H04L 12/2692; G06F 2209/5022
See application file for complete search history.

(56) References Cited

U.S. PATENT DOCUMENTS

| | | | | |
|---|---|---|---|---|
| 7,239,865 | B2* | 7/2007 | Dyck et al. | 455/411 |
| 7,843,327 | B1* | 11/2010 | DiMartino et al. | 340/539.11 |
| 8,018,334 | B1* | 9/2011 | DiMartino | G08B 13/1409 340/505 |
| 8,918,843 | B1* | 12/2014 | Vivanco | H04L 29/06 709/229 |
| 2006/0153122 | A1* | 7/2006 | Hinman et al. | 370/328 |
| 2012/0240197 | A1* | 9/2012 | Tran et al. | 726/4 |
| 2013/0029661 | A1* | 1/2013 | Fong | G08B 21/22 455/426.1 |
| 2013/0331028 | A1* | 12/2013 | Kuehnel et al. | 455/41.1 |
| 2014/0304783 | A1* | 10/2014 | Fujiwara et al. | 726/4 |
| 2015/0103697 | A1* | 4/2015 | Jin | H04W 48/00 370/254 |

* cited by examiner

*Primary Examiner* — Krisna Lim

(57) ABSTRACT

Disclosed herein are a method and a corresponding apparatus that provides a tethering alert if the apparatus is tethering data. In one example, a method for providing a tethering alert by an apparatus having a first network communication interface and a second network communication interface is disclosed. The method includes i) receiving incoming data via one of the first network communication interface and the second network communication interface, ii) sending outgoing data via the other of the first network communication interface and the second network communication interface, iii) making a determination that there is a threshold similarity between the incoming data and the outgoing data, and iv) responsive to making the determination, the apparatus providing a tethering alert indicating that the apparatus is tethering data.

21 Claims, 4 Drawing Sheets

METHOD AND APPARATUS FOR GENERATING A TETHERING ALERT BASED ON A THRESHOLD SIMILARITY BETWEEN INCOMING DATA AND OUTGOING DATA

BACKGROUND

Wireless communication devices (WCD), such as mobile phones and tablets have become increasingly popular in recent years. For a user, a WCD may offer a variety of services including those provided by software applications such as media players and personal information managers. WCDs may also be Internet-enabled, which allows them to provide Internet-based services such as email, web browsing, and media streaming. Internet-connectivity may be provided to a WCD through a variety of means, including for example, through a wireless network.

One example of a wireless network that may provide Internet-connectivity to a WCD is a wireless local-area network (WLAN). In this arrangement, the WCD may include a WLAN interface (including a WLAN antenna) that connects with a wireless access point (WAP) of the WLAN such that the WCD may exchange data with the WLAN. The connection is made using a protocol that is common to both the WCD and the WAP (e.g., one of the many WI-FI protocols defined by the Institute of Electrical and Electronics Engineers (IEEE)). The WLAN may also connect with the Internet via a modem, thereby providing Internet-connectivity to the WCD.

WLANs typically extend over a generally localized area. For example, the IEEE's most recently adopted WI-FI protocol, 801.11n, specifies an indoor range of up to approximately 230 feet, an outdoor range of up to approximately 820 feet, and data connection speeds of up to 150 Megabits per second (though actual ranges and speeds are likely to be less due to factors such as environmental conditions and hardware limitations). WLANs are often password protected or utilize other security measures to ensure that only authorized WCDs may connect with them. For these and other reasons, WLANs are commonly used in residential, business, and consumer-focused commercial environments (e.g., coffee shops and airports) to provide Internet-connectivity to WCDs.

Another example of a wireless network that may provide Internet-connectivity to a WCD is a wireless wide-area network (WWAN). WWANs operate in a manner similar to WLANs, but WWANs typically provide coverage over a relatively larger area. A WWAN typically includes multiple base stations that are dispersed across an area (e.g., a city). Each base station radiates to define a cell, including one or more cell sectors in which WCDs can operate. A WCD may include a WWAN interface (including a WWAN antenna) that may connect with one or more of the base stations. This connection uses a protocol that is common to both the WCD and the base station, examples of which include code-division multiple access (CDMA), Evolution Data Optimization (EV-DO), Global System for Mobile (GSM), WiMax (IEEE 802.16), and Long Term Evolution (LTE) protocols.

The WWAN may also connect, via a network infrastructure, with the Internet or another transport network. With this arrangement, the WWAN may provide Internet-connectivity to the WCD via the network infrastructure. Network infrastructure may include for example, a base station controller, a switch (e.g., a mobile switching center), and/or a gateway (e.g., one that communicates with a packet-switched network).

Since a WWAN typically includes several base stations dispersed across an area, WWANs often provide expansive geographical coverage of Internet-connectivity for WCDs. While data connection speeds provided by WWANs have been relatively slow for many years (e.g., as compared to WLAN speeds), recent advances have allowed for greatly increased WWAN data connection speeds.

Internet-connectivity provided via a WWAN is typically managed by a WWAN provider (sometimes referred to as a cellular carrier) and is often provided to consumers in connection with a "data plan." For example, a data plan may provide a user with a monthly allotment of data (i.e., that a given WCD may exchange with the Internet via the WWAN) for a monthly fee. In many instances, these data plans are specific to a particular WCD such that a user may need to obtain a separate data plan for each separate WCD that needs Internet-connectivity. However, a feature known as "tethering" may allow one WCD to provide an Internet connection to other WCDs.

OVERVIEW

With tethering, a WCD shares its data connection (e.g., an Internet connection) with one or more local WCDs by bridging data communications made via its WWAN interface and its WLAN interface. In particular, as the tethering WCD receives data via its WWAN interface from the Internet, the tethering WCD may pass the data via its WLAN interface to a local WCD. Similarly, as the tethering WCD receives data via its WLAN interface from the local WCD, the tethering WCD may pass the data via its WWAN interface to the Internet.

While tethering may be beneficial for a user, use of the feature may also be costly to a WWAN provider (or other associated entity). Indeed, if a tethering WCD shares its Internet-connection with local WCDs, a user may have less of an incentive to purchase additional data plans for each of those other local WCDs. Further, when a tethering WCD shares data with multiple local WCDs, it effectively aggregates the data transfer activity of all of those local WCDs, and channels it though the single tethering WCD. This may increase the amount of data being transferred via the WWAN. Since base stations have a limited bandwidth capacity, additional base stations may need to be added to a WWAN to support such increased demands, thereby adding cost to the WWAN provider's operation of the WWAN.

For at least some of the reasons discussed above, WWAN providers may attempt to regulate use of the tethering feature on WCDs. For instance, a WWAN provider may simply inform its users (e.g., via the provider's terms of service), that users are not authorized to use the tethering feature. Further, in some cases, the WWAN provider may take further measures to ensure such compliance. For example, the WWAN provider may modify the operating system of select WCDs to disable use of the feature. The WWAN provider may then enable use of the feature for a particular WCD once authorized, such as upon a user paying a fee (e.g., as a monthly subscription fee added to the user's regular data plan fee).

Despite a WWAN provider's efforts to disable use of the tethering feature on WCDs, in some instances a user may make an unauthorized modification to the operating system of a WCD to enable use of the feature. Such unauthorized modifications are sometimes referred to as hacking, rooting, or jail-breaking a WCD, and often violate the WWAN's terms of service.

For at least some of the reasons discussed above, WWAN providers may seek to determine whether WCDs are tethering data and/or determine whether the WCDs are authorized for tethering data.

Disclosed herein are a method and a corresponding apparatus for providing a tethering alert if the apparatus is tethering data. When a WCD (or other apparatus) is tethering data, the WCD receives incoming data via one of the WCD's interfaces (e.g., a WWAN interface) and forwards the incoming data as outgoing data via another one of the WCD's interfaces (e.g., a WLAN interface). As such, if there is a threshold similarity between the incoming data and the outgoing data, one likely scenario is that the WCD is tethering data. Therefore, responsive to the WCD determining that there is a threshold similarity between the incoming data and the outgoing data, the WCD may generate a tethering alert.

DETAILED DESCRIPTION

Throughout this disclosure, any reference to "a," "an," or "the" refers to "at least one," or "the at least one," unless otherwise specified.

Figure 1:
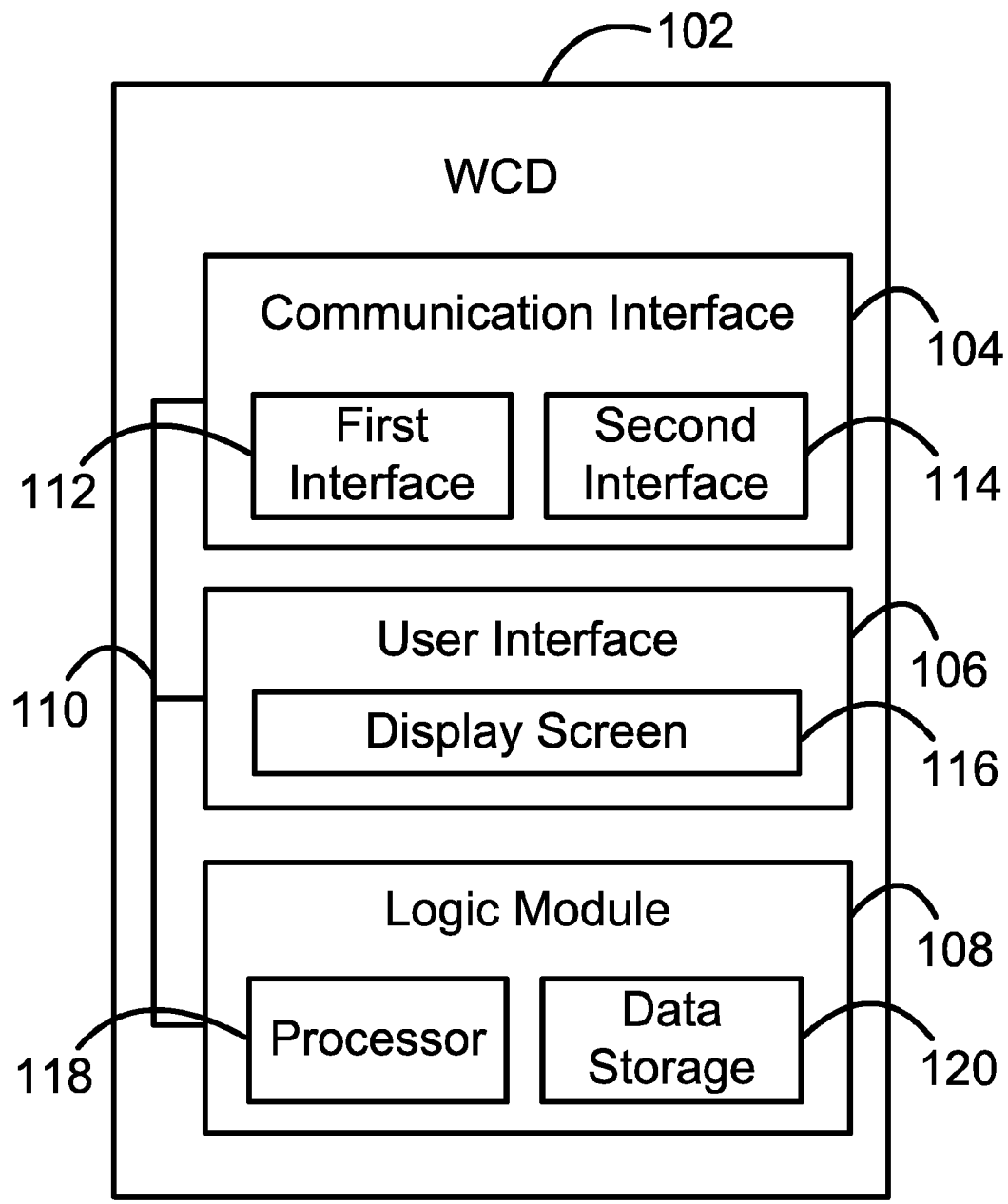
FIG. 1 is a block diagram depicting example components of a WCD arranged to implement functions in accordance with examples herein.

Referring to the drawings, as noted above, FIG. 1 is a simplified block diagram of a WCD (or other apparatus) 102 arranged to implement functions in accordance with examples described herein. The WCD 102 may take any of a variety of forms, including for example a cellular phone, tablet, laptop, media player, gaming device, or telemetry device. The WCD 102 may be a standalone device or the WCD 102 may be embedded in another device.

As shown, the WCD 102 may include a communication interface 104, a user interface 106, and a logic module 108, all of which may be coupled together by a system bus, network, or other connection mechanism 110.

The communication interface 104 may include a first interface 112 and a second interface 114, either of which may be a wired or wireless network communication interface. For example, a wired network communication interface may be or include a universal serial bus (USB) interface, and a wireless network communication interface may be or include a WWAN interface (e.g., based on the LTE protocol) or a WLAN interface (e.g., based on the BLUETOOTH or WI-FI protocol). Each wireless network communication interface also includes a corresponding antenna.

The user interface 106 may facilitate interaction with a user of the WCD 102 if applicable. As such, the user interface 106 may include output components such as a speaker and a display screen 116, and input components such as a keypad, a touch-sensitive screen, a microphone, and a camera.

The logic module 108 may take the form of a processor 118 and a data storage 120. The processor 118 may include one or more general-purpose processors (e.g., microprocessors) and/or special-purpose processors (e.g., digital signal processors and/or application specific integrated circuits) and may be integrated in whole or in part with the communication interface 104 and/or the user interface 106.

The data storage 120 may include one or more volatile and/or non-volatile storage components and may be integrated in whole or in part with the processor 118. The data storage 120 may take the form of a non-transitory computer-readable medium and may contain program instructions, that when executed by the processor 118, cause the WCD 102 to perform one or more of the functions described herein. Such instructions may be executed, for example, to perform application-level or operating-system-level operations of the WCD 102. The WCD 102 may be configured to enable (and potentially use) or disable a tethering feature.

In one example, the WCD 102 may be configured to provide a tethering alert if there is a threshold similarity between incoming data that the WCD 102 receives and outgoing data that the WCD 102 sends. In another example, the WCD 102 may be configured to provide a tethering alert if the WCD has not received user input that corresponds to incoming data.

Figure 2:
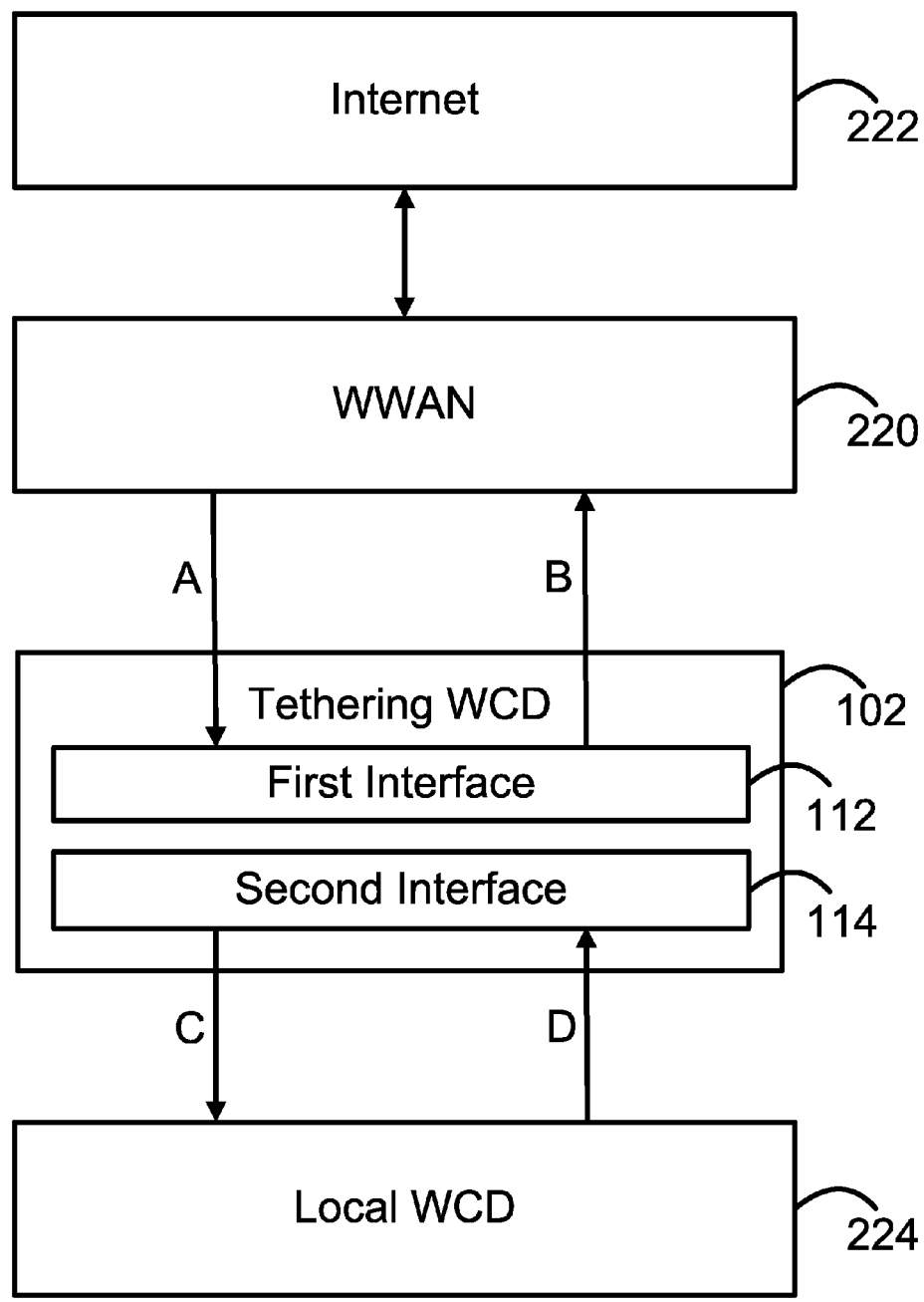
FIG. 2 is a block diagram depicting an example arrangement where the WCD of FIG. 1 is tethering data between a WWAN and a local WCD.

FIG. 2 shows a simplified block diagram depicting an example arrangement where the WCD 102 is tethering data. In the example of FIG. 2, the first interface 112 is a WWAN interface and the WCD 102 connects via the first interface 112 with a WWAN 220. With this arrangement, the WCD 102 may exchange data with the WWAN 220 by the WCD 102 receiving data via the first interface 112 from the WWAN 220 (path A), and the WCD 102 sending data via the first interface 112 to the WWAN 220 (path B).

The WWAN 220 may also connect with the Internet 222 such that the WWAN 220 and the Internet 222 may exchange data. As such, as the WCD 102 may be configured to send data to the WWAN 220, and the data may be forwarded by the WWAN 220 to the Internet 222. Likewise, data sent from the WWAN 220 to the WCD 102 may have previously been forwarded from the Internet 222 to the WWAN 220.

The WCD 102 may connect via the second interface 114 with a local WCD (or other local apparatus) 224. With this arrangement, the WCD 102 may exchange data with the local WCD 224 by the WCD 102 receiving data via the second interface 114 from the local WCD 224 (path C), and the WCD 102 sending data via the second interface 114 to the local WCD 224 (path D).

The arrangement shown in FIG. 2 is just one example. The first interface 112 may be any type of interface any may connect to any type of network or device, which in turn may or may not be connected to the Internet or another network. Similarly, the second interface 114 may be any type of interface and may connect to any type of local apparatus.

When the WCD 102 is tethering data, the WCD 102 may receive incoming data via the first interface 112 from the WWAN 220 (path A). The WCD 102 may then forward the incoming data via the second interface 114 as outgoing data to a tethered local WCD 224 (path C). Similarly, data may move in the opposite direction. In particular, the WCD 102 may receive incoming data via the second interface 114 from the local WCD 224 (path D). The WCD 102 may then forward the incoming data via the first interface 112 as outgoing data to the WWAN 220 (path B). Incoming data and outgoing data may include data organized and/or transferred in any manner (e.g., as packet data).

In the example shown in FIG. 2, regardless of the direction that the data travels, if there is a threshold similarity between the incoming data received by the WCD 102 and the outgoing data sent from the WCD 102, one likely scenario is that the WCD 102 is tethering data. As such, responsive to the WCD 102 determining that there is a threshold similarity between the incoming data and the outgoing data, the WCD 102 may generate a tethering alert.

Figure 3:
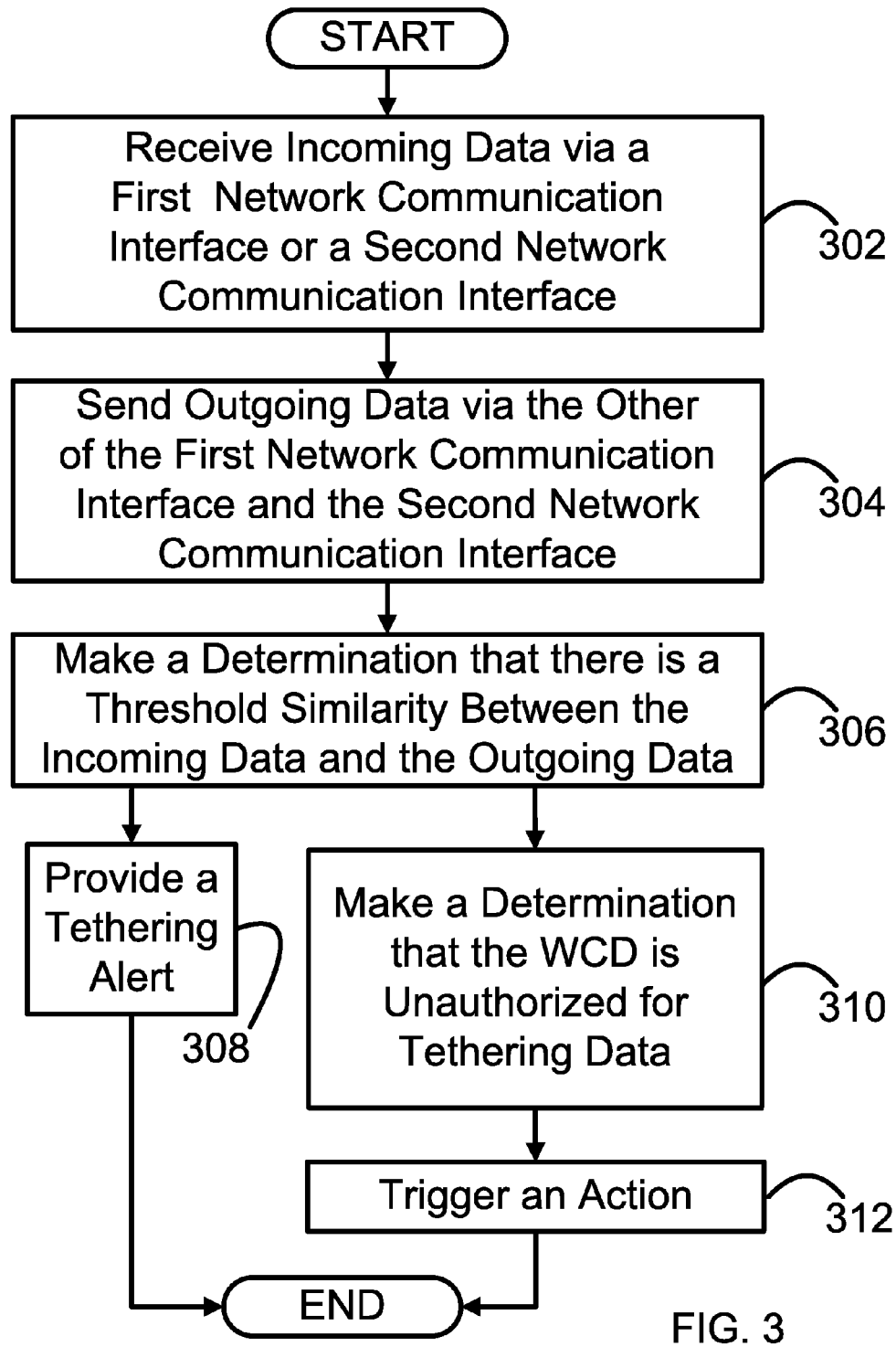
FIG. 3 is a flow chat depicting example functions of providing a tethering alert.

FIG. 3 shows a flow chart depicting example functions of providing a tethering alert. The WCD 102 may perform the functions in a different order than that shown in FIG. 3.

Further, the functions may take the form of program instructions stored on the data storage 120, that when executed by the processor 118, cause the WCD 102 to perform the recited functions.

In block 302, the method includes receiving incoming data via a first network communication interface or a second network communication interface. In one example, the WCD 102 shown in FIG. 2 may be configured to receive data at the first interface 112 or the second interface 114. Data may be received continuously or in a time restricted manner, for example.

In block 304, the method includes sending outgoing data via the other of the first network communication interface and the second network communication interface. In one example, the WCD 102 includes the first interface 112 and the second interface 114. In instances in which the WCD 102 receives data via the first interface 112, the WCD 102 may be configured to send data on the other network communication interface, e.g., the second interface 114. The WCD 102 may be configured to operate to receive or send data via any network communication interface of the WCD 102.

Referring to the example illustration in FIG. 2, blocks 302 and 304 of FIG. 3 together may represent an instance in which data is flowing from the WWAN 220, through the WCD 102, and to the tethered local WCD 224 (i.e., the pair of paths A and C). Alternatively, blocks 302 and 304 together may represent an instance in which data is flowing from the tethered local WCD 224, through the WCD 102, and to the WWAN 220 (i.e., the pair of paths B and D).

In block 306, the method includes making a determination that there is a threshold similarity between the incoming data and the outgoing data. For example, the WCD 102 may be configured to make the determination if there is a threshold percentage of the incoming data included in the outgoing data. Further, in instances where the data is stored and transferred as packet data, a WCD may make the determination if there is a threshold similarity between content in a payload portion of the incoming data and content in a payload portion of the outgoing data (e.g., using deep packet inspection techniques). Alternatively, the WCD 102 may make the determination if there is a threshold similarity between a destination address portion of the incoming data and a destination address portion of the outgoing data. For example, the WCD 102 may make the determination if a threshold percentage of packets in the incoming data and outgoing data have a same destination address (i.e., as stored in a destination address field in the respective packet header).

In still other instances, the WCD 102 may determine the threshold similarity between the incoming data and the outgoing data based on a rate of data having a threshold similarity. As an example, for a WCD having a first network communication interface and a second network communication interface that both support packet transfer speeds of approximately 80,000 packets per second, the WCD may make the determination that there is a threshold similarity between the incoming data and the outgoing data if the incoming data and the outgoing data have 60,000 packets per second that are similar or identical. As another example, the WCD 102 may make the determination that there is a threshold similarity between the incoming data and the outgoing data if at least 75% of packets sent as incoming data per second are similar or identical to corresponding packets sent as outgoing data.

The disclosed techniques of how the WCD 102 may make a determination that there is a threshold similarity between the incoming data and the outgoing data are just examples. Indeed, the WCD 102 may use other techniques, now know or later discovered, to make such a determination.

In block 308, the method includes providing a tethering alert that indicates that a WCD is tethering data. In one example, the WCD 102 may be configured to make the determination that there is a threshold similarity between the incoming data and the outgoing data, and responsively provides a tethering alert that indicates that the WCD 102 is tethering data. Providing the tethering alert may take a variety of forms. For example, providing the tethering alert may include the WCD 102 sending to a WWAN provider, a message indicating that the WCD 102 is tethering data, and sending an identifier associated with the WCD 102.

The identifier associated with the WCD 102 may be one of several types, including for example, an identifier of the WCD 102, an identifier of a component of the WCD 102, an identifier of an account associated with the WCD 102, or an identifier of a user of group of users associated with the WCD 102. Examples of an identifier of the WCD 102 may be an electronic serial number (ESN) or an international mobile equipment identify (IMEI) number. An identifier of a component of the WCD 102 may be, for example, a media access control (MAC) address of a network communication interface of the WCD 102. An identifier of an account associated with the WCD 102 may be, for example, a subscriber identity module (SIM) number. An identifier of a user or a group of users associated with the WCD 102 may be, for example, a username provided by a user. These various types and specific examples of identifiers are non-limiting.

In block 310, the method includes making a determination that the WCD 102 is unauthorized for tethering data. In one example, the WCD 102 may be configured to make this determination, for example, by sending the identifier associated with the WCD 102 to a server associated with the WWAN provider, which makes the determination itself and communicates the same back to the WCD 102. The server may make the determination that the WCD 102 is unauthorized for tethering data by comparing the identifier with a list of identifiers associated with WCDs 102 that are authorized for using the feature, and failing to find a match.

At block 312, the method includes triggering an action. In one example, responsive to the WCD 102 making the determination that the WCD 102 is unauthorized for tethering data, the method involves the WCD 102 triggering an action. For example, the action may involve the WCD 102 providing notice to a user such as by displaying a message on the display screen 116 indicating that the WCD 102 is tethering data and/or that such tethering is unauthorized. The message may further offer the user the option to pay a fee in exchange for the WWAN provider authorizing the WCD 102 to tether data (e.g., via over-the-air (OTA) activation).

In another example, the WWAN provider may seek to prevent or inhibit the WCD 102 from continued unauthorized tethering, and therefore the action may involve at least partially disabling the first interface 112 and/or the second interface 114. In some instances, the action may involve partial disablement instead of complete disablement to still allow the user to place emergency calls. Partial disablement may also involve the WWAN provider using data caps or other limitations to control or limit functionality of the WCD 102.

In other examples, a WCD may be configured to consider input behavior (or a lack thereof) from a user to determine whether the WCD is tethering data. As the WCD provides Internet-related services, the WCD sends a data request as outgoing data to the Internet. The Internet then sends responsive data (i.e., based on the data request) to the WCD as incoming data. A data request is often triggered by a user who provides input to the WCD via an input component of a user interface. As such, if a WCD receives incoming data together with corresponding user input, one likely scenario is that the user's input caused the WCD to receive the incoming data, and as such the WCD is likely not tethering data.

For example, if a user seeks to browse a website using a web-browsing application of a WCD, the user may first launch the web-browsing application and then select a website to view. The user may perform this selection, for example, by navigating through and selecting one of a list of bookmarked websites, or by entering and submitting a URL of the website into a text field. In either example, the user provides input via an input component (e.g., by pushing a physical keypad or making a gesture on a touch-sensitive screen). As a result, the WCD sends a data request (which requests the selected website) as outgoing data to the Internet. Upon receipt by the Internet, the Internet processes the request and sends responsive data (i.e., representing the website) that the WCD receives as incoming data.

To the contrary, if a WCD is being used to tether data, as the WCD receives incoming data, the WCD likely receives no corresponding input from a user. As such, if a WCD receives incoming data, but does not receive corresponding user input, the WCD may provide a tethering alert.

Figure 4:
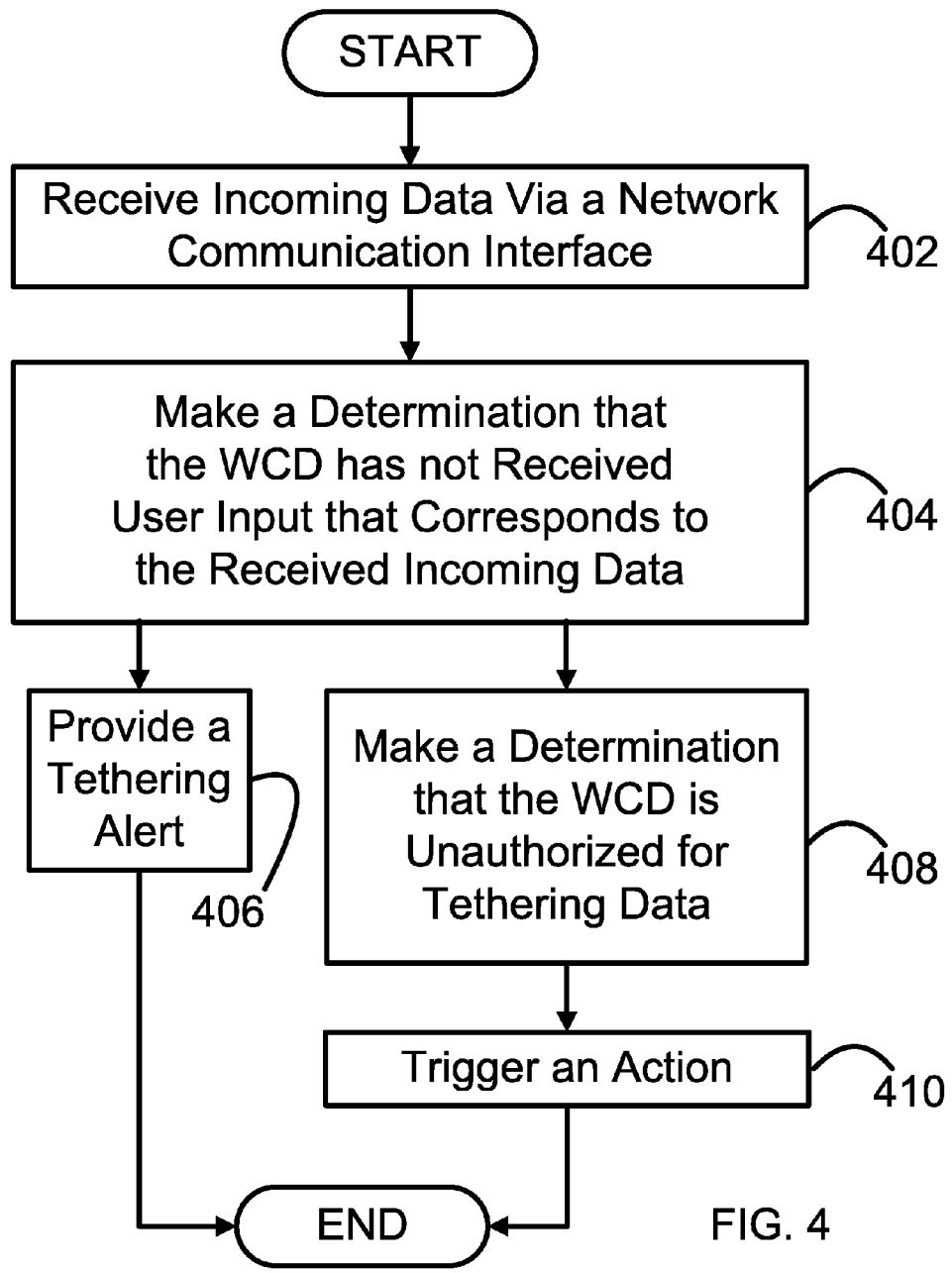
FIG. 4 is another flow chat depicting example functions of providing a tethering alert.

Turning now to FIG. 4, a flow chart depicting example functions of providing a tethering alert is shown. In block 402, the method includes receiving incoming data via a network communication interface. In one example, the WCD 102 may be configured to receive incoming data via the first interface 112. In block 404, the method includes making a determination that the WCD 102 has not received user input that corresponds to the received incoming data. For example, the WCD 102 may make this determination responsive to the WCD 102 determining that the WCD 102 has not received any user input within a threshold time period of the WCD 102 receiving the incoming data.

The determination that the WCD 102 has not received user input that corresponds to the received incoming data may also depend on the type of incoming data received by a WCD. For example, since the Internet may send select data (e.g., automatic application updates) to a WCD without being in response to a data request, when a WCD receives this type of data, the WCD may automatically make the determination that user input corresponds to the received incoming data. This may cause the WCD to effectively ignore such incoming data for the purposes of determining whether the WCD is tethering data.

Next, the method includes functions of blocks 406, 408, and 410, which parallel the functions of blocks 308, 310, and 312, respectively (as described above for FIG. 3). As such, in block 406, the method includes providing a tethering alert that indicates that a WCD is tethering data. In one example, the WCD 102 may be configured to provide a tethering alert that indicates that the WCD 102 is tethering data responsive to the WCD 102 making the determination that the WCD 102 has not received user input that corresponds to the received incoming data.

In block 408, the method includes making a determination that a WCD is unauthorized for tethering data. In one example, the WCD 102 may be configured to make the determination that the WCD is unauthorized for tethering data. In block 410, the method includes triggering an action. In one example, the WCD 102 may be configured to trigger an action.

While in some examples the functions of FIGS. 3-4 have been described as being performed by the WCD 102, in other examples, one or more of the functions may be performed by one or more other entities.

Further, while examples of methods and apparatuses have been described above, those of ordinary skill in the art will appreciate that variations from the examples described are possible, and that numerous changes may therefore be made while remaining within the true scope being indicated by the claims.

We claim:

1. A method for providing a tethering alert by an apparatus, the apparatus having a first network communication interface and a second network communication interface, the method comprising:
    receiving incoming data via one of the first network communication interface and the second network communication interface;
    sending outgoing data via the other of the first network communication interface and the second network communication interface;
    making a determination that there is a threshold similarity between the incoming data and the outgoing data; and
    responsive to making the determination, the apparatus providing a tethering alert indicating that the apparatus is tethering data.

2. The method of claim 1, wherein the first network communication interface comprises a wireless wide-area network (WWAN) interface and the second network communication interface comprises a wireless local-area network (WLAN) interface.

3. The method of claim 1, wherein the first network communication interface comprises a WWAN interface, and wherein the apparatus providing a tethering alert comprises sending by the apparatus, via the first network communication interface, to a WWAN provider, (i) a message indicating that the apparatus is tethering data, and (ii) an identifier associated with the apparatus.

4. The method of claim 1, wherein the apparatus further includes a display, and wherein the determination is a first determination, the method further comprising:
    making a second determination that the apparatus is unauthorized for tethering data; and
    responsive to making the second determination, displaying a message on the display indicating that unauthorized tethering has been detected.

5. The method of claim 1, wherein the determination is a first determination, the method further comprising:
    making a second determination that the apparatus is unauthorized for tethering data; and
    responsive to making the second determination, at least partially disabling at least one of the first network communication interface and the second network communication interface.

6. The method of claim 1, wherein the determination is a first determination, and wherein making the first determination that there is a threshold similarity between the incoming data and the outgoing data comprises making a second determination that a threshold percentage of the incoming data is included in the outgoing data.

7. The method of claim 1, wherein the incoming data comprises incoming packet data and the outgoing data comprises outgoing packet data.

8. The method of claim 7, wherein the determination is a first determination, and wherein making the first determination that there is a threshold similarity between the incoming packet data and the outgoing packet data comprises making a second determination that there is a threshold similarity between content in a payload portion of the incoming packet data and content in a payload portion of the outgoing packet data.

9. The method of claim 7, wherein the determination is a first determination, and wherein making the first determination that there is a threshold similarity between the incoming packet data and the outgoing packet data comprises making a second determination that there is a threshold similarity between a destination address portion of the incoming packet data and a destination address portion of the outgoing packet data.

10. An apparatus comprising:
a first network communication interface arranged for receiving incoming packet data; and
a second network communication interface arranged for sending outgoing packet data,
wherein the apparatus is configured to provide a tethering alert that indicates that the apparatus is tethering data, the providing being responsive to making a determination that there is a threshold similarity between the incoming packet data and the outgoing packet data.

11. The method of claim 10, wherein the first network communication interface comprises a wireless wide-area network (WWAN) interface and the second network communication interface comprises a wireless local-area network (WLAN) interface.

12. The method of claim 10, wherein the first network communication interface comprises a wireless wide-area network (WWAN) interface, and wherein providing a tethering alert comprises sending by the apparatus, via the first network communication interface, to a WWAN provider, (i) a message indicating that the apparatus is tethering data, and (ii) an identifier associated with the apparatus.

13. The method of claim 10, wherein the apparatus further includes a display, wherein the determination is a first determination, and wherein the apparatus is further configured for (i) making a second determination that the apparatus is unauthorized for tethering data, and (ii) responsive to making the second determination, displaying a message on the display indicating that unauthorized tethering has been detected.

14. The method of claim 10, wherein the determination is a first determination, wherein the apparatus is further arranged for (i) making a second determination that the apparatus is unauthorized for tethering data, and (ii) responsive to making the second determination, at least partially disabling at least one of the first network communication interface and the second network communication interface.

15. The method of claim 10, wherein the determination is a first determination, wherein making the first determination that there is a threshold similarity between the incoming packet data and the outgoing packet data comprises making a second determination that there is a threshold similarity between content in a payload portion of the incoming packet data and a content in a payload portion of the outgoing packet data.

16. The method of claim 10, wherein the determination is a first determination, and wherein making the first determination that there is a threshold similarity between the incoming packet data and the outgoing packet data comprises making a second determination that there is a threshold similarity between a destination address portion of the incoming packet data and a destination address portion of the outgoing packet data.

17. A wireless communication device (WCD) comprising:
a wireless first network communication interface;
a second network communication interface; and
a logic module coupled to the first network communication interface and the second network communication interface, wherein the logic module comprises a processor, and wherein the logic module is configured to cause performance of a plurality of functions comprising (i) receiving incoming data via one of the first network communication interface and the second network communication interface, (ii) sending outgoing data via the other of the first network communication interface and the second network communication interface, (iii) making a determination that there is a threshold similarity between the incoming data and the outgoing data, and (iv) responsive to making the determination, providing a tethering alert that indicates that the WCD is tethering data.

18. The WCD of claim 17, wherein the first network communication interface comprises a wireless wide-area network (WWAN) interface, and wherein providing a tethering alert comprises sending by the WCD, via the first network communication interface, to a WWAN provider (i) a message indicating that the WCD is tethering data, and (ii) an identifier associated with the WCD.

19. The WCD of claim 18, wherein the determination is a first determination, the plurality of functions further comprising:
making a second determination that the WCD is unauthorized for tethering data; and
responsive to making the second determination, at least partially disabling one of the first and second network communication interfaces.

20. The WCD of claim 18, wherein the incoming data comprises incoming packet data and the outgoing data comprises outgoing packet data, wherein the determination is a first determination, and wherein making the first determination that there is a threshold similarity between the incoming packet data and the outgoing packet data comprises making a second determination that there is a threshold similarity between content in a payload portion of the incoming packet data and content in a payload portion of the outgoing packet data.

21. A method for providing a tethering alert by an apparatus, the apparatus having a network communication interface, the method comprising:
the apparatus receiving incoming data via the network communication interface;
the apparatus making a determination that the apparatus has not received user input that corresponds to the received incoming data; and
responsive to making the determination, the apparatus providing a tethering alert indicating that the apparatus is tethering data.

* * * * *